United States Patent
Chiu et al.

(10) Patent No.: US 10,552,404 B2
(45) Date of Patent: Feb. 4, 2020

(54) RETROSPECTIVE SNAPSHOTS IN LOG-STRUCTURED STORAGE SYSTEMS

(71) Applicant: International Business Machines Corporation, Armonk, NY (US)

(72) Inventors: Lawrence Y. Chiu, Saratoga, CA (US);
Aayush Gupta, San Jose, CA (US);
Paul H. Muench, San Jose, CA (US);
Sangeetha Seshadri, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/280,850

(22) Filed: Sep. 29, 2016

(65) Prior Publication Data
US 2018/0089034 A1   Mar. 29, 2018

(51) Int. Cl.
*G06F 16/23* (2019.01)
*G06F 16/27* (2019.01)
*G06F 16/11* (2019.01)

(52) U.S. Cl.
CPC ........ *G06F 16/2358* (2019.01); *G06F 16/128* (2019.01); *G06F 16/27* (2019.01)

(58) Field of Classification Search
CPC ........... G06F 11/1451; G06F 17/30088; G06F 17/30368; G06F 17/30575; G06F 2201/84
USPC ........................................................ 707/739
See application file for complete search history.

(56) References Cited

U.S. PATENT DOCUMENTS

| | | | |
|---|---|---|---|
| 8,364,648 B1 | 1/2013 | Sim-Tang | |
| 8,583,598 B2 | 11/2013 | Shaull et al. | |
| 8,789,208 B1* | 7/2014 | Sundaram | H04L 29/06 726/29 |
| 8,943,282 B1* | 1/2015 | Armangau | G06F 17/30088 711/126 |
| 9,400,816 B1* | 7/2016 | Gubarev | G06F 17/30321 |
| 2005/0066118 A1* | 3/2005 | Perry | G06F 11/1469 711/112 |
| 2010/0199042 A1* | 8/2010 | Bates | G06F 11/2064 711/114 |

(Continued)

OTHER PUBLICATIONS

Shaull, R. et al., "A modular and Efficient Past State System for Berkeley DB," Jun. 2014, USENIX Annual Technical Conference (USENIX ATC 14), pp. 157-168, United States.

(Continued)

*Primary Examiner* — Hosain T Alam
*Assistant Examiner* — Nicholas E Allen
(74) *Attorney, Agent, or Firm* — Sherman IP LLP; Kenneth L. Sherman; Steven Laut

(57) ABSTRACT

One embodiment provides a method for retrospective snapshot creation including creating, by a processor, a first snapshot that captures logical state of a data store at a first key. Creation of the first snapshot is based on determining a log offset corresponding to the first key, determining existence of a second snapshot that captures logical state of the data store and recording a retrospective snapshot at a last valid log address offset prior to the first key upon a determination that the second snapshot exists based on determining at least one of: whether log address offsets from a first log entry of a log to a log entry of the log at the first key are contiguous and whether log address offsets from the second snapshot to the first key are contiguous.

19 Claims, 8 Drawing Sheets

(56) References Cited

U.S. PATENT DOCUMENTS

| | | | | |
|---|---|---|---|---|
| 2011/0184918 | A1* | 7/2011 | Atluri | G06F 17/30368 707/683 |
| 2014/0089264 | A1* | 3/2014 | Talagala | G06F 11/1471 707/649 |
| 2014/0136575 | A1 | 5/2014 | Zhao et al. | |
| 2014/0195675 | A1* | 7/2014 | Silver | H04L 65/1083 709/224 |
| 2014/0244935 | A1* | 8/2014 | Ezra | G06F 3/0614 711/133 |
| 2014/0279900 | A1* | 9/2014 | Gupta | G06F 17/30309 707/634 |
| 2014/0282795 | A1* | 9/2014 | Kummer | H04N 21/238 725/116 |
| 2015/0106335 | A1* | 4/2015 | Hunt | G06F 16/1873 707/639 |
| 2015/0134616 | A1* | 5/2015 | Zheng | G06F 17/30575 707/639 |
| 2015/0281764 | A1* | 10/2015 | Stathacopoulos | H04N 21/4316 725/41 |
| 2015/0286695 | A1* | 10/2015 | Kadayam | G06F 11/1448 707/639 |
| 2015/0378870 | A1* | 12/2015 | Marron | G06F 11/362 717/128 |
| 2016/0103860 | A1* | 4/2016 | Bhattacharjee | G06F 17/30309 707/607 |
| 2016/0110403 | A1* | 4/2016 | Lomet | G06F 17/30356 707/695 |
| 2016/0110408 | A1* | 4/2016 | Madhavarapu | G06F 17/30578 707/615 |
| 2016/0139836 | A1* | 5/2016 | Nallathambi | G06F 3/0619 711/114 |
| 2016/0147614 | A1* | 5/2016 | Mittal | G06F 11/1469 707/615 |
| 2016/0248583 | A1* | 8/2016 | McClanahan | G06F 21/78 |

OTHER PUBLICATIONS

Ta-Shma, P. et al., "Virtual Machine Time Travel Using Continuous Data Protection and Checkpointing," Jan. 2008, ACM SIGOPS Operating Systems Review, pp. 127-134, vol. 42, No. 1, ACM, United States.

Mell, P., et al., "The NIST Definition of Cloud Computing", National Institute of Standards and Technology Special Publication 800-145, Sep. 2011, pp. 1-7, U.S. Department of Commerce, United States.

* cited by examiner

RETROSPECTIVE SNAPSHOTS IN LOG-STRUCTURED STORAGE SYSTEMS

BACKGROUND

Typical log-structured storage systems store record data in temporal order in a "log." These typical systems allow basic primitive operations, such as insert, update, delete, read. Each update of data results in a new record being inserted at the tail of the "log." Each delete results in a tombstone object being inserted at the tail of the log. Additionally, background garbage collection process compacts the data reclaiming space that does not contain valid data.

SUMMARY

Embodiments relate to retrospective snapshot creation for log-structured storage systems. One embodiment provides a method for retrospective snapshot creation including creating, by a processor, a first snapshot that captures logical state of a data store at a first key. Creation of the first snapshot is based on determining a log offset corresponding to the first key, determining existence of a second snapshot that captures logical state of the data store and recording a retrospective snapshot at a last valid log address offset prior to the first key upon a determination that the second snapshot exists based on determining at least one of: whether log address offsets from a first log entry of a log to a log entry of the log at the first key are contiguous and whether log address offsets from the second snapshot to the first key are contiguous.

These and other features, aspects and advantages of the present invention will become understood with reference to the following description, appended claims and accompanying figures.

DETAILED DESCRIPTION

Figure 1:
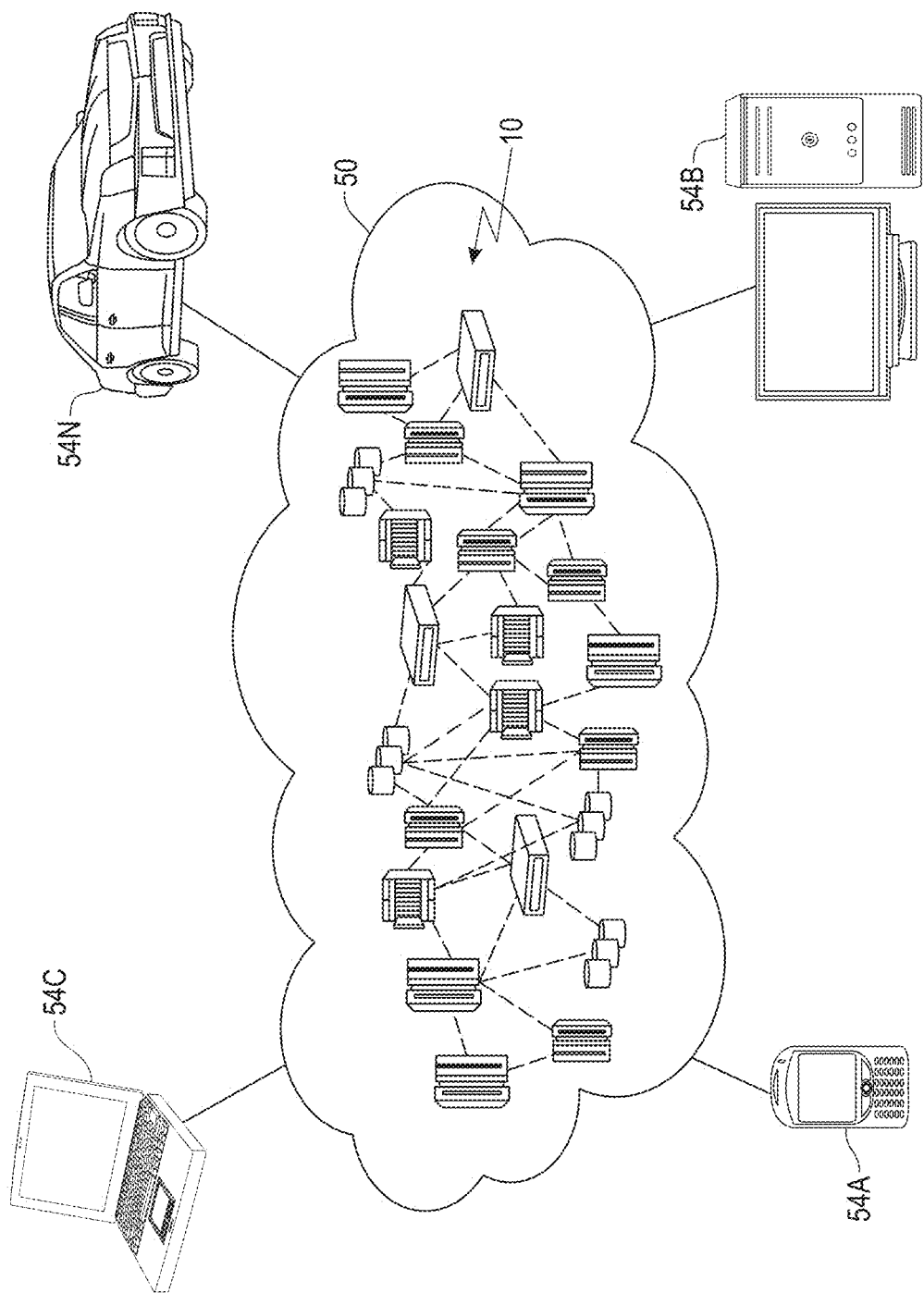
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for retrospective snapshot creation. One embodiment includes creating, by a processor, a first snapshot that captures logical state of a data store at a first key. Creation of the first snapshot is based on determining a log offset corresponding to the first key, determining existence of a second snapshot that captures logical state of the data store and recording a retrospective snapshot at a last valid log address offset prior to the first key upon a determination that the second snapshot exists based on determining at least one of: whether log address offsets from a first log entry of a log to a log entry of the log at the first key are contiguous and whether log address offsets from the second snapshot to the first key are contiguous.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
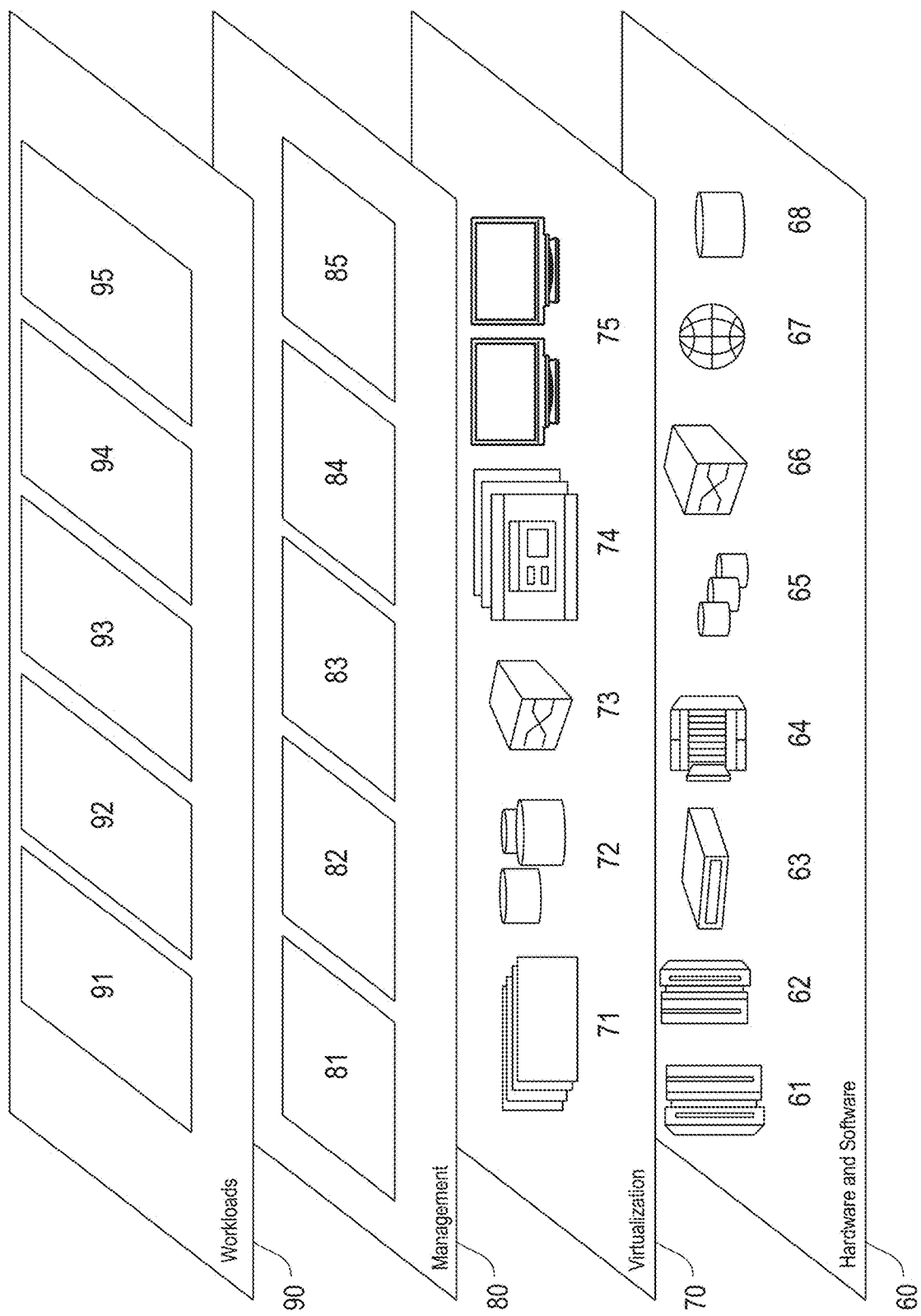
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
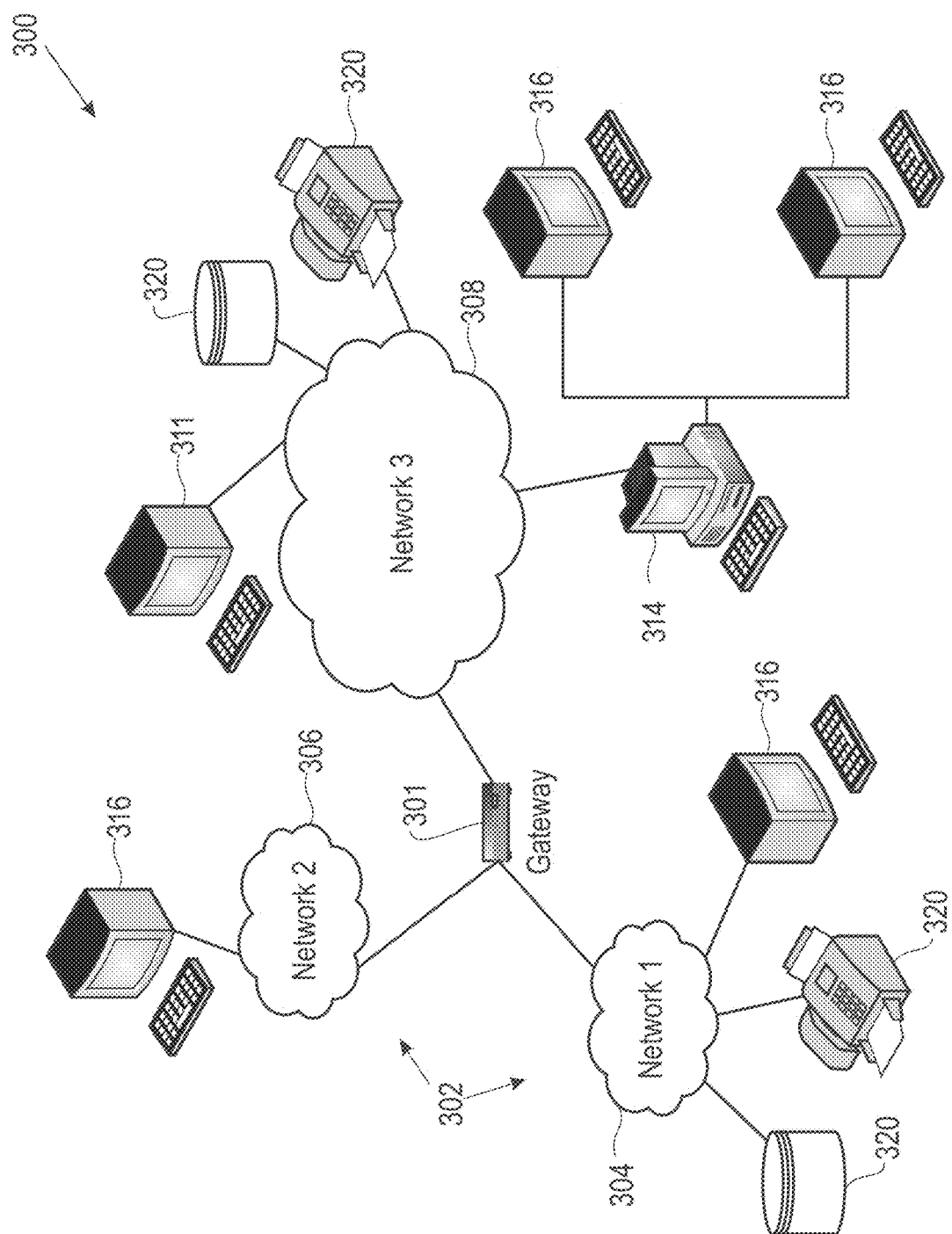
FIG. 3 is a network architecture for retrospective snapshots in log-structured storage systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
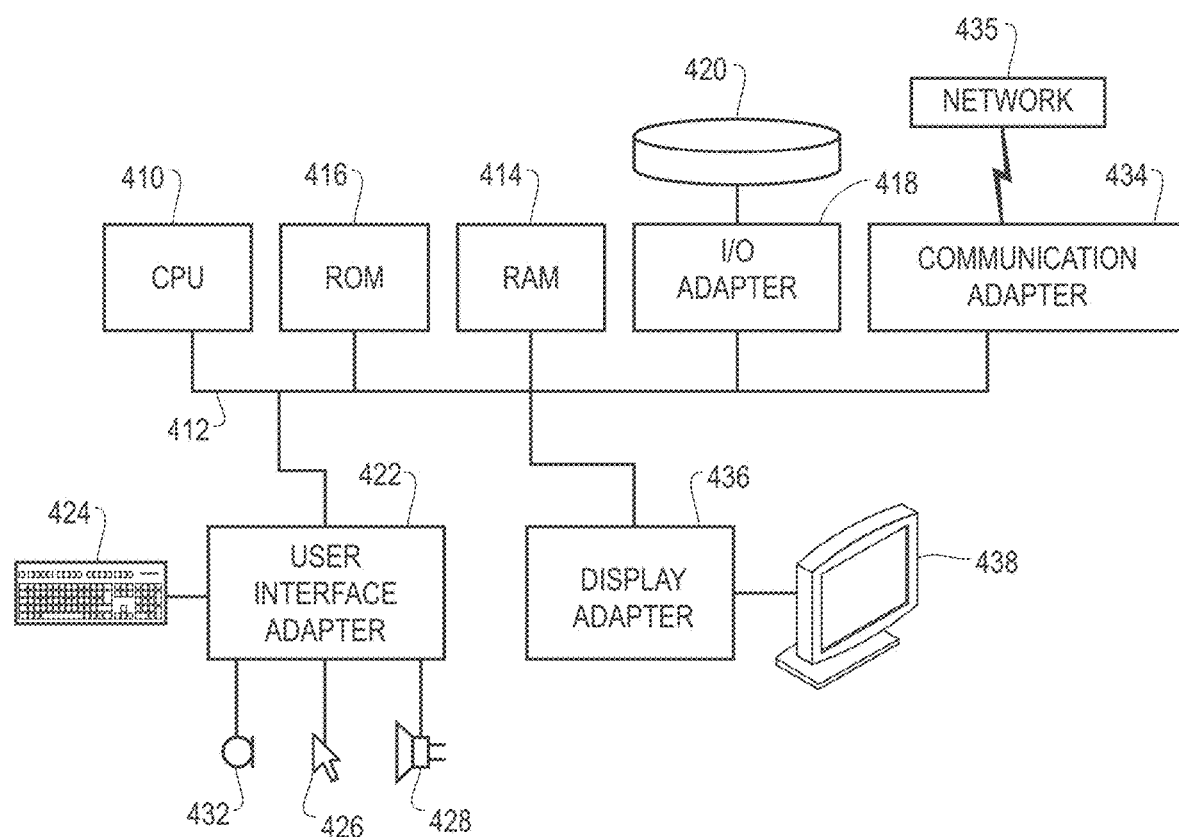
FIG. 4 shows a representative hardware environment that may be associated with the servers and/or clients of FIG. 1, according to an embodiment.

FIG. 4 shows a representative hardware system 400 environment associated with a user device 416 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
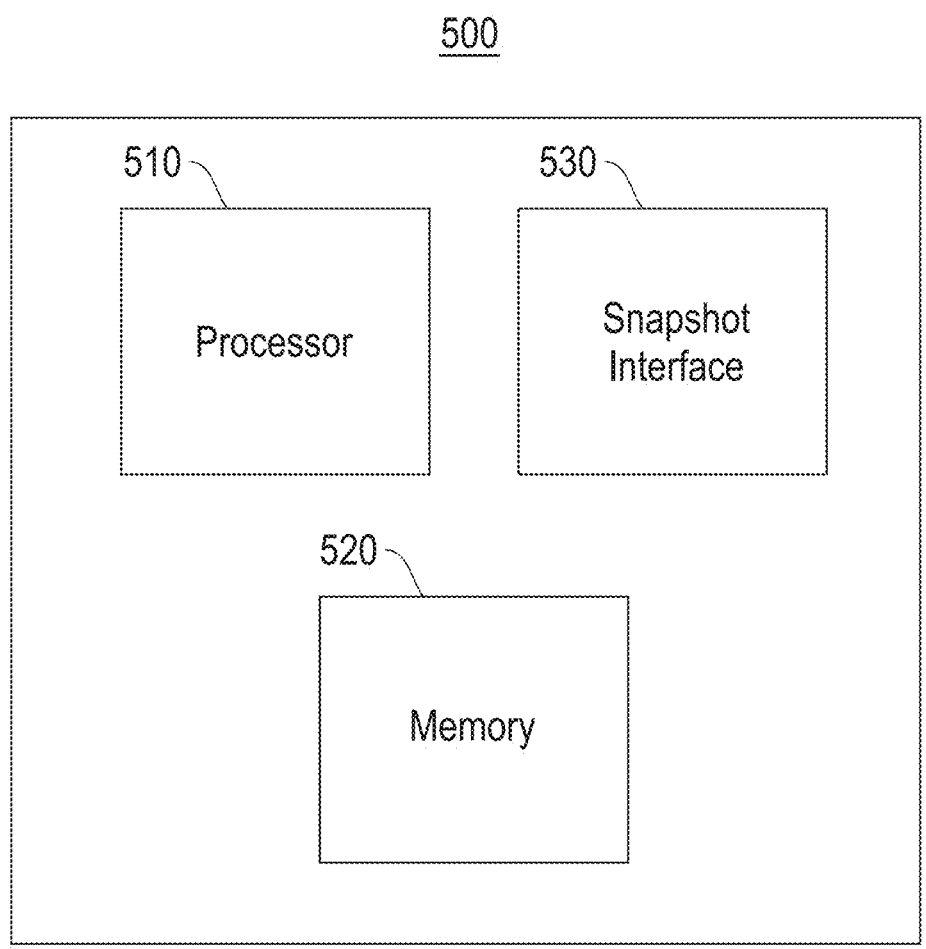
FIG. 5 is a block diagram illustrating a processor for retrospective snapshots in log-structured storage systems, according to an embodiment.

FIG. 5 is a block diagram illustrating a processing node 500 for retrospective snapshots in log-structured storage systems, according to an embodiment. The processing node 500 includes one or more processors 510, a snapshot interface 530 and a memory 520. In one embodiment, each processor(s) 510 performs processing of snapshots in log structures. The snapshot interface 530 provides reconstruction of a consistent logical state of a store, where a log is replayed from the beginning of the log (or from a valid checkpoint) until a snapshot offset. The snapshot interface also provides for limiting garbage collection to prevent garbage collection across snapshot boundaries. The term garbage collection refers to reclaiming "disk space" occupied by stale entries in the log. For example, when a record is inserted, an entry is added to the tail of the log. When the same record is deleted, a tombstone entry is added to the tail of the log. The tombstone entry refers to the original location of the data on disk as created by the insert. The disk space occupied by the original inserted record may be garbage collected (provided the system is not maintaining older versions). Stale data may be the result of records that have been deleted or updated. Updates result in stale data because older versions of the data that are maintained in the log are no longer needed. Note that in a log-structured store, every insert, update or delete operation results in a record being inserted at the tail of the log.

In one embodiment, snapshots in a log structure store capture the logical state of a data store as of a given point in time. Snapshots in a log-structured store in essence record the last offset ("snapshot offset") in the "log" at a given point in time. To reconstruct the consistent logical state of the store, the log is replayed from the beginning of the log (or from a valid checkpoint) until the "snapshot offset" and the in-memory structures (such as indexes) are reconstructed to effectively reconstruct a snapshot of the store.

Figure 6:
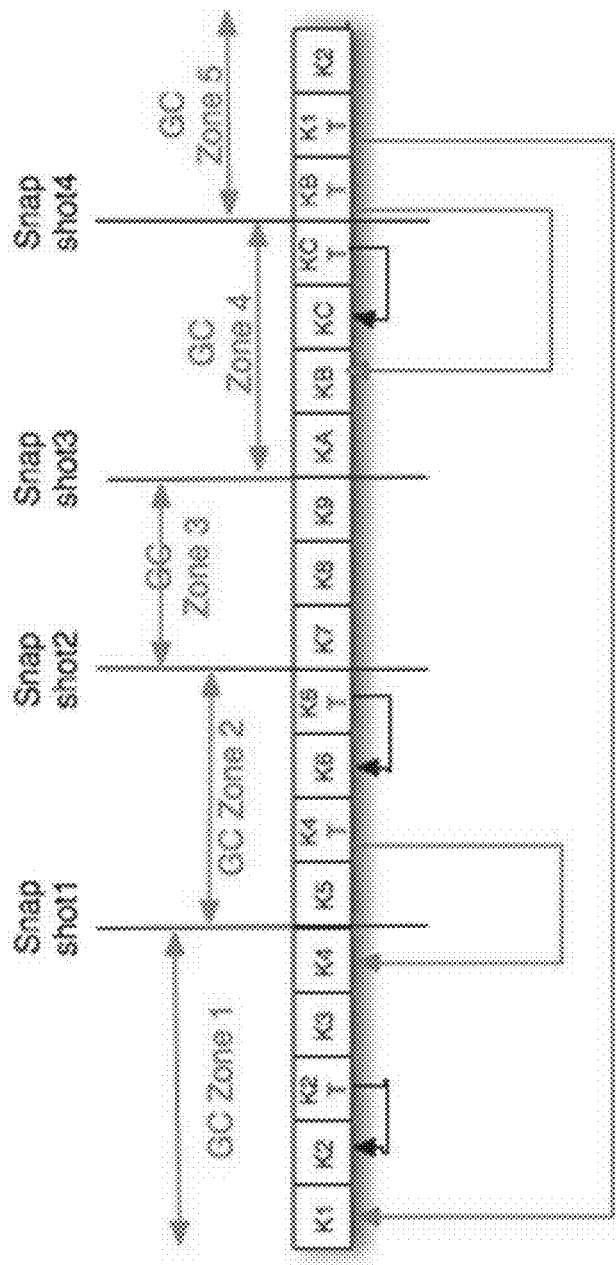
FIG. 6 illustrates interaction of garbage collection with snapshots.

FIG. 6 illustrates interaction of garbage collection (GC) with snapshots. In order to achieve logical correctness, certain garbage collection should not be performed across snapshot boundaries. For instance, a delete may have occurred after a snapshot point. This implies the data existed as of the time of the snapshot. Garbage collecting the data record based on the aforementioned delete would result in an inconsistency. The following rules are applied for the snapshots and GC zones. Rule 1: GC scope is limited to a GC Zone, which maintains snapshot fidelity. Rule 2: Tombstones that refer to objects across snapshot boundaries are known as Cross-Snapshot Tombstones (CSTs) and cannot be garbage collected as long as the snapshots are valid. Rule 3: Tombstones which refer to objects within a GC Zone are referred to as Intra-snapshot tombstones (ISTs) and can be garbage collected. Garbage collecting within a GC Zone: 1. Objects eligible for garbage collection are described by the rules above. 2. Index Checkpoints which lie within a snapshot boundary and live indexes may be impacted by object relocation during garbage collection.

Some of the issues related to the interaction of GC with snapshots are that consistent snapshots cannot be taken in retrospect. For instance, the following requests cannot be made: "Create a snapshot as of last week," and "Create a snapshot as of last month." The reason for not being able to make the aforementioned requests is because the GC process may have already interfered with the logical correctness. Consider the following sequence of events:

Insert record with key K1 in week 1.

Delete record with key K1 in week 2.

In week 3, since no snapshot exists yet, GC removes both the insert and delete records with key K1.

In week 4, the following request is issued "create snapshot as of week 1." This operation is unsuccessful since the record with key K1 has already been deleted and would leave the snapshot inconsistent. However, this rule is overly restrictive. For instance, if the workload consisted mostly of inserts (such as in a time series, or Internet of Things (IoT) or sensor scenario), very little ad-hoc GC occurs.

To overcome the shortcomings and issues mentioned above, one or more embodiments provide processing for creation of consistent snapshots in retrospective when the following conditions are met. If all "log" addresses from the last snapshot (or the beginning of the log, if no snapshot exists previously) are present contiguously in the log, provide for creation of a snapshot in retrospective. The following underlying guarantee is required from the system: log addresses should never be reused and should always be monotonically increasing and contiguous. This is true since upper layer indexes are of the form <key, log address> and reuse of log addresses will result in corruption. As long as the above guarantee is met, irrespective of whether the log is always maintained in chronological order or not, the retrospective snapshot creation will hold.

In one embodiment, retrospective snapshot creation is based on a specific log address or a specific key. In one embodiment, the key itself is a timestamp. Then the system creates retrospective_snapshot $S_x$ for key $K_x$, where $K_x$ refers to a unique key or in a versioning system, can refer to a specific version of a key. In one embodiment, internally both operations are translated to a retrospective_snapshot for the log address corresponding to a timestamp or key $K_x$. If the conditions described above are not met, the snapshot operation cannot proceed and will fail.

In one embodiment, in order to support retrospective snapshot by time, a timestamp should be recorded for each entry in the log. A secondary index on the timestamp may be used to quickly locate the log address for the corresponding key. In one embodiment, a snapshot is associated with a specific log address in the log.

Figure 7:
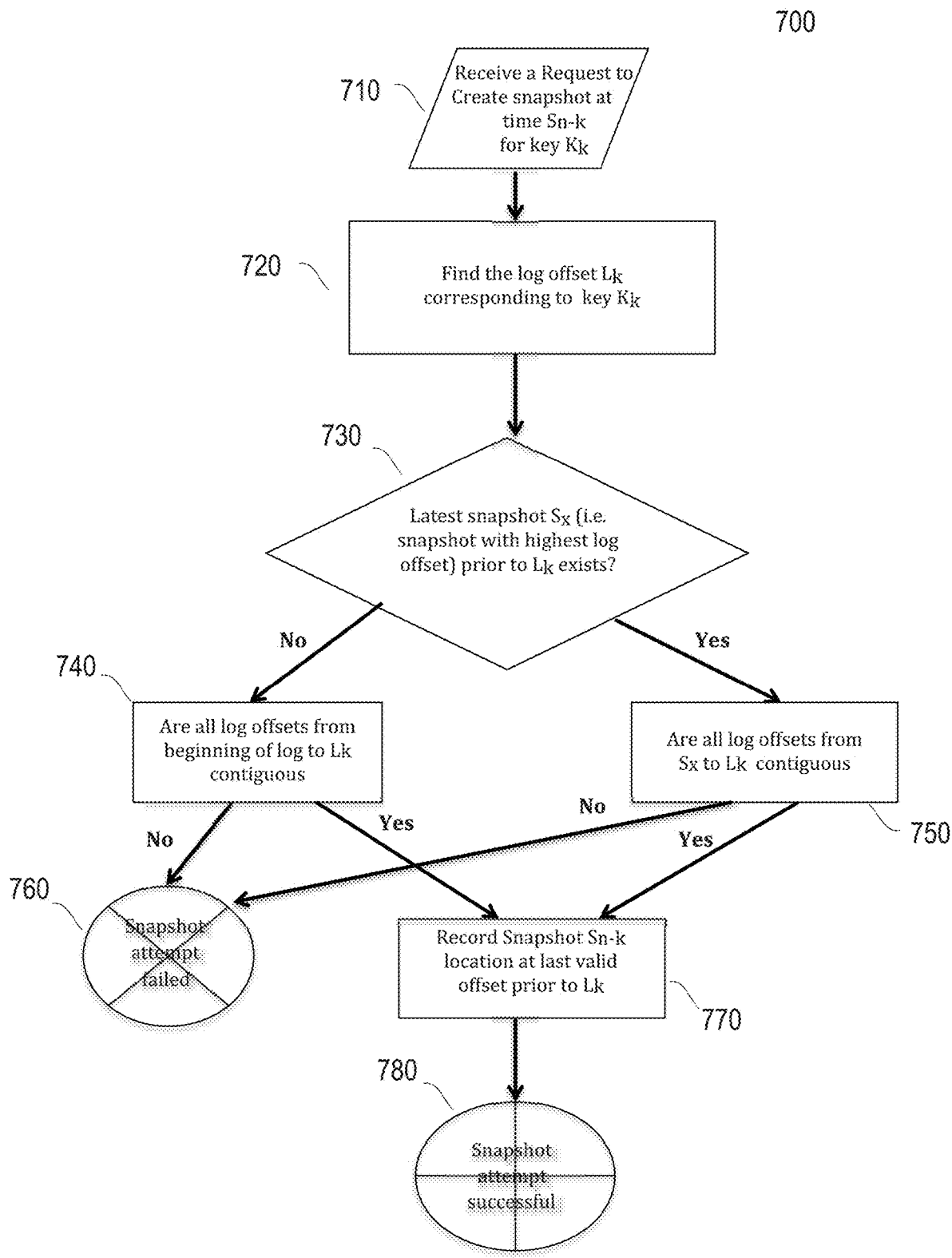
FIG. 7 is a block diagram illustrating flow for key based retrospective snapshots, according to an embodiment.

FIG. 7 is a block diagram illustrating flow for a process 700 for key based retrospective snapshots, according to an embodiment. Process 700 describes the process of creating a retrospective snapshot given a key. Process 700 provides for trade-off of space efficiency with need to create snapshots in retrospective (i.e., space efficiency is achieved because garbage collection is not completely turned off). In block 710 request to create a snapshot operation $S_{n-k}$ for key $K_k$ is received, where n and k are positive integers. In block 720 process 700 finds the log offset $L_k$ corresponding to key $K_k$. In block 730, it is determined if the latest snapshot $S_x$ (i.e., a snapshot with the highest log offset) prior to $L_k$ exists (i.e. a snapshot $S_x$ recorded in the log before $L_k$). If it is determined that the latest snapshot $S_x$ prior to $L_k$ does exist, process 700 proceeds to block 750. Otherwise, process 700 proceeds to block 740.

In one embodiment, in block 740 it is determined whether all log offsets from the beginning of the log to $L_k$ are contiguous or not. If it is determined that all log offsets from the beginning of the log to $L_k$ are contiguous (implying that no garbage collection that will affect the snapshot fidelity has occurred), process 700 proceeds to block 770. Otherwise process 700 proceeds to block 760. In one embodiment, in block 750 it is determined whether all log offsets from $S_x$ to $L_k$ are contiguous. If it is determined that all log offsets from $S_x$ to $L_k$ are contiguous, process 700 proceeds to block 770. Otherwise process 700 proceeds to block 760.

In one embodiment, in block 760, since it is determined that all log offsets from the beginning of the log to $L_k$ are not contiguous, the snapshot attempt failed and process 700 ends. In block 770 the snapshot $S_{n-k}$ location at the last valid offset prior to $L_k$ is recorded. After block 770, process 700 proceeds to block 780 where the snapshot attempt is noted as being successful; then process 700 ends.

Figure 8:
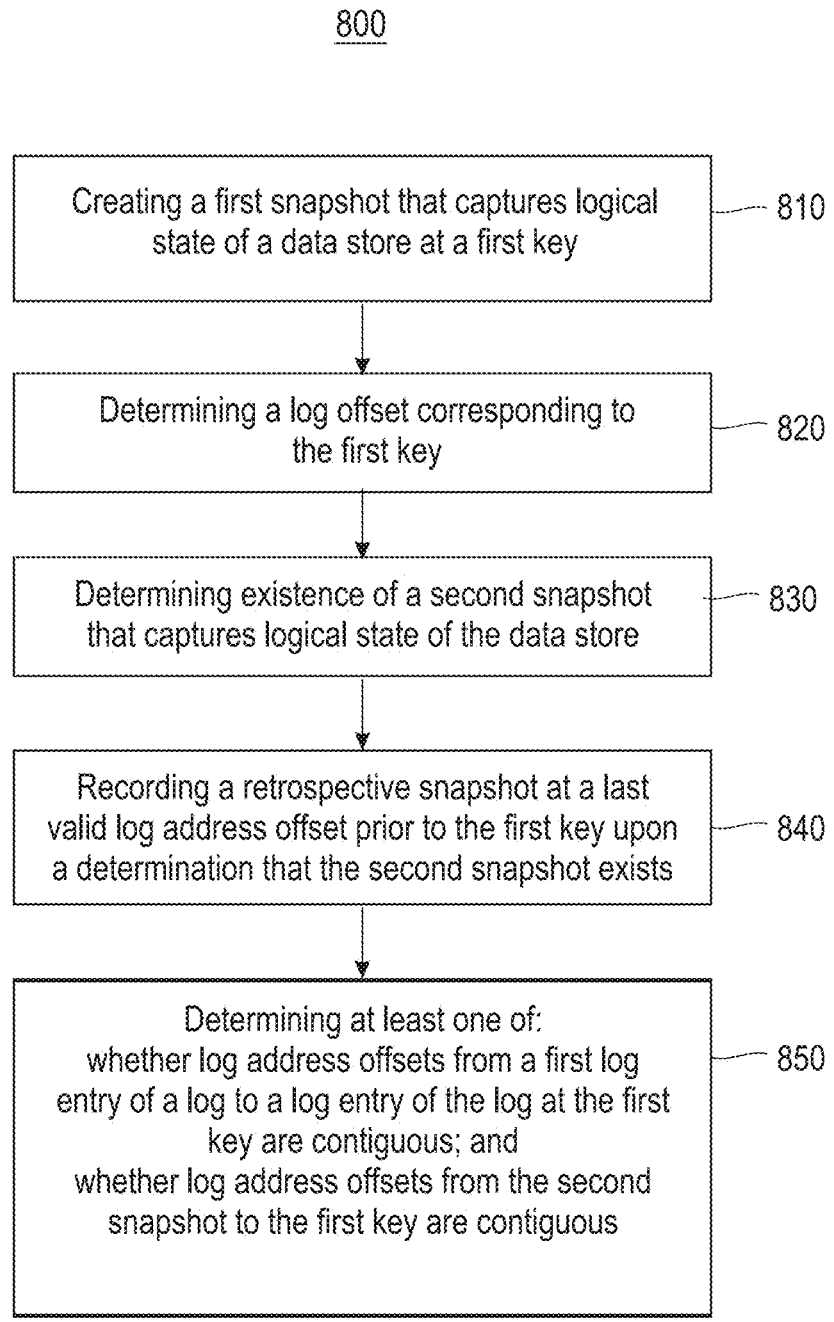
FIG. 8 illustrates a block diagram for a process for retrospective snapshots in log-structured storage systems, according to one embodiment.

FIG. 8 illustrates a block diagram for a process 800 for retrospective snapshots in log-structured storage systems, according to one embodiment. In block 810 process 800 includes creating (e.g., by a processor 510), a first snapshot that captures logical state of a data store at a first key. In block 820 a log offset corresponding to the first key is determined. In block 830 creation of the first snapshot is based on: determining existence of a second snapshot (i.e., older snapshot) that captures logical state of the data store. In one embodiment, the second snapshot is not a requirement and is only an optimization that allows for continuity checks to be performed from the latest snapshot to a new desired snapshot offset and not form the beginning of the log each time. In one example, a retrospective snapshot may be created even if there is no prior snapshot that exists in the system. Block 840 includes recording a retrospective snapshot at a last valid log address offset prior to the first key upon a determination that the second snapshot exists based on block 830 determining at least one of: whether log address offsets from a first log entry of a log to a log entry of the log at the first key are contiguous, and whether log address offsets from the second snapshot to the first key are contiguous.

In one embodiment, process 800 provides that log addresses are not reused, monotonically increase and are contiguous. In one example, in process 800 the second snapshot has a largest log address offset than other snapshots prior to the first key. In one embodiment, the second snapshot is a retrospective snapshot for a log address corresponding to the first key.

Process 800 may further include that creation of the retrospective snapshot fails upon at least one of: the log address offsets from the first log entry to the log entry at the first key are non-contiguous, and the log address offsets from the second snapshot to the first key are non-contiguous. Process 800 may further include locating a log address for a corresponding key using a secondary index.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for retrospective snapshot creation comprising:
    creating, by a processor, a first snapshot that captures logical state of a data store at a first key, wherein creation of the first snapshot is based on:
        determining a log offset corresponding to the first key;
        determining existence of a second snapshot that captures logical state of the data store;
        creating and recording a retrospective snapshot at a last valid log address offset prior to the first key upon a determination that the second snapshot exists prior to the first key based on:
            determining at least one of:
                whether log address offsets from a first log entry of a log to a log entry of the log at the first key are contiguous; and
                whether log address offsets from the second snapshot to the first key are contiguous; and
    applying a plurality of rules for snapshots and garbage collection zones to prevent garbage collection of the data store across snapshot boundaries, wherein a first rule of the plurality of rules includes limiting garbage collection scope to a garbage collection zone to maintain snapshot fidelity.

2. The method of claim 1, wherein:
    log addresses are not reused, monotonically increase and are contiguous;
    a second rule of the plurality of rules includes avoiding garbage collection of cross-snapshot tombstones for valid snapshots;
    the cross-snapshot tombstones are objects across snapshot boundaries; and
    the retrospective snapshot is created without prior existence of the retrospective snapshot.

3. The method of claim 2, wherein:
    the second snapshot has a largest log address offset than other snapshots prior to the first key;
    a third rule of the plurality of rules includes garbage collecting intra-snapshot tombstones; and
    intra-snapshot tombstones are objects within a garbage collection zone.

4. The method of claim 3, wherein the second snapshot is a retrospective snapshot for a log address corresponding to the first key.

5. The method of claim 4, wherein creation of the retrospective snapshot fails upon at least one of:
    the log address offsets from the first log entry to the log entry at the first key are non-contiguous; and
    the log address offsets from the second snapshot to the first key are non-contiguous.

6. A computer program product for retrospective snapshot creation, the computer program product comprising a computer readable storage medium having program instructions embodied therewith, the program instructions executable by a processor to cause the processor to:
    create, by a processor, a first snapshot that captures logical state of a data store at a first time in a time range, wherein creation of the retrospective snapshot is based on:
        determine, by the processor, a log offset corresponding to the first key;
        determine, by the processor, existence of a second snapshot that captures logical state of the data store;
        create and record, by the processor, a retrospective snapshot at a last valid log address offset prior to the first key upon a determination that the second snapshot exists based on:
            determining, by the processor, at least one of:
                whether log address offsets from a first log entry of a log to a log entry of the log at the first key are contiguous; and
                whether log address offsets from the second snapshot to the first key are contiguous; and
    apply, by the processor, a plurality of rules for snapshots and garbage collection zones to prevent garbage collection of the data store across snapshot boundaries, wherein a first rule of the plurality of rules includes limiting garbage collection scope to a garbage collection zone to maintain snapshot fidelity.

7. The computer program product of claim 6, wherein:
    log addresses are not reused, monotonically increase and are contiguous;
    a second rule of the plurality of rules includes avoiding garbage collection of cross-snapshot tombstones for valid snapshots;
    the cross-snapshot tombstones are objects across snapshot boundaries; and
    the retrospective snapshot is created without prior existence of the retrospective snapshot.

8. The computer program product of claim 7, wherein:
    the second snapshot has a largest log address offset than other snapshots prior to the first key;
    a third rule of the plurality of rules includes garbage collecting intra-snapshot tombstones; and
    intra-snapshot tombstones are objects within a garbage collection zone.

9. The computer program product of claim 8, wherein the second snapshot is a retrospective snapshot for a log address corresponding to the first key.

10. The computer program product of claim 9, wherein creation of the retrospective snapshot fails upon at least one of:
    the log address offsets from the first log entry to the log entry at the first key are non-contiguous; and
    the log address offsets from the second snapshot to the first key are non-contiguous.

11. The computer program product of claim 10, further comprising program instructions executable by the processor to cause the processor to:
    record, by the processor, a key for each log entry in the log.

12. The computer program product of claim 11, further comprising program instructions executable by the processor to cause the processor to:

locate, by the processor, a log address for a corresponding key using a secondary.

13. An apparatus comprising:

a memory storing instructions; and a processor executing the instructions to create a first snapshot that captures logical state of a data store at a first key, wherein creation of the first snapshot is based on the processor:

determining a log offset corresponding to the first key;

determining existence of a second snapshot that captures logical state of the data store;

creating and recording a retrospective snapshot at a last valid log address offset prior to the first key upon a determination that the second snapshot exists based on the processor further:

determining at least one of:

whether log address offsets from a first log entry of a log to a log entry of the log at the first key are contiguous; and whether log address offsets from the second snapshot to the first key are contiguous; and apply a plurality of rules for snapshots and garbage collection zones to prevent garbage collection of the data store across snapshot boundaries, wherein a first rule of the plurality of rules includes limiting garbage collection scope to a garbage collection zone to maintain snapshot fidelity.

14. The apparatus of claim 13, wherein:

log addresses are not reused, monotonically increase and are contiguous;

a second rule of the plurality of rules includes avoiding garbage collection of cross-snapshot tombstones for valid snapshots;

the cross-snapshot tombstones are objects across snapshot boundaries; and the retrospective snapshot is created without prior existence of the retrospective snapshot.

15. The apparatus of claim 14, wherein:

the second snapshot has a largest log address offset than other snapshots prior to the first key;

a third rule of the plurality of rules includes garbage collecting intra-snapshot tombstones; and intra-snapshot tombstones are objects within a garbage collection zone.

16. The apparatus of claim 15, wherein the second snapshot is a retrospective snapshot for a log address corresponding to the first key.

17. The apparatus of claim 16, wherein creation of the retrospective snapshot fails upon at least one of:

the log address offsets from the first log entry to the log entry at the first key are non-contiguous; and the log address offsets from the second snapshot to the first key are non-contiguous.

18. The apparatus of claim 13, wherein the processor further executes instructions comprising recordation of a key for each log entry in the log.

19. The apparatus of claim 13, wherein the processor further executes instructions comprising locating a log address for a corresponding key using a secondary index.

* * * * *